G. W. SINGER.
AUTOMOBILE FENDER.
APPLICATION FILED FEB. 28, 1920.
1,346,345.
Patented July 13, 1920.
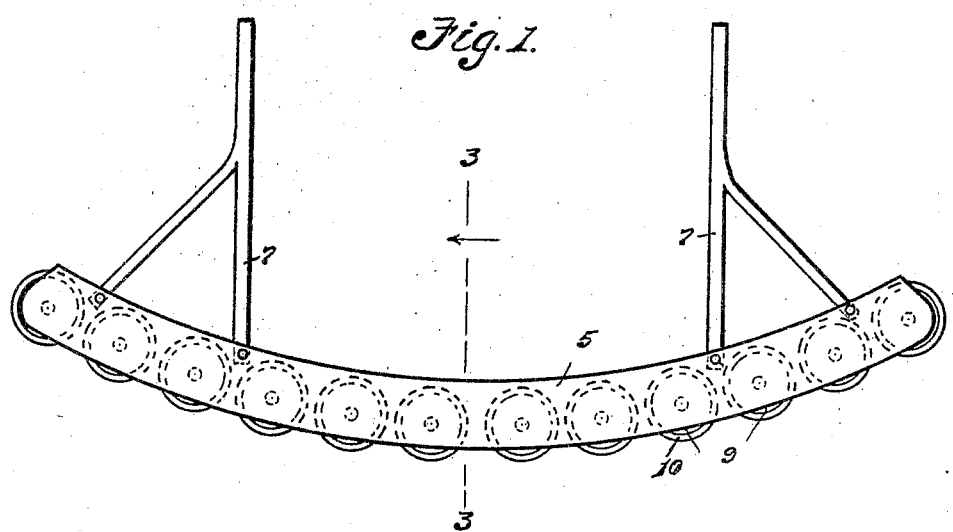
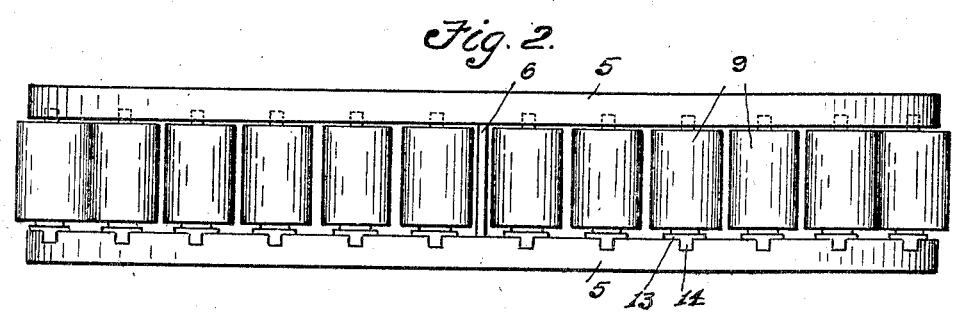
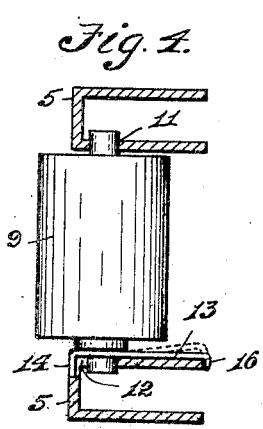
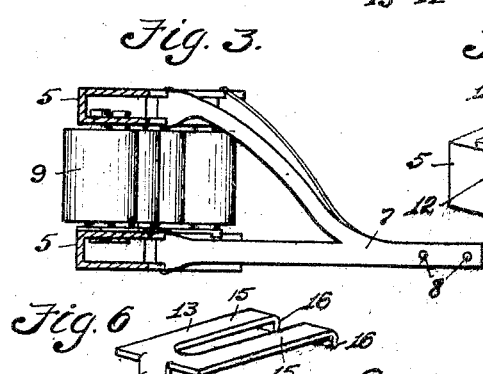
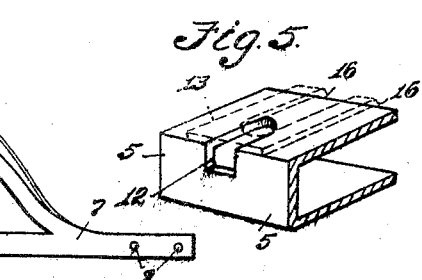
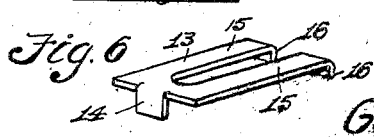
George W. Singer
INVENTOR
By George J. Ittsch
ATTORNEY.

UNITED STATES PATENT OFFICE.

GEORGE W. SINGER, OF SOUTH BEND, INDIANA.

AUTOMOBILE-FENDER.

1,346,345. Specification of Letters Patent. Patented July 13, 1920.

Application filed February 28, 1920. Serial No. 361,959.

*To all whom it may concern:*

Be it known that I, GEORGE W. SINGER, a citizen of the United States, residing at South Bend, in the county of St. Joseph and State of Indiana, have invented certain new and useful Improvements in Automobile-Fenders, of which the following is a specification.

My invention relates to fenders particularly adapted for automobiles, and one of the objects of the invention resides in the provision of a fender provided with rollers adapted to receive the blow upon impact with another automobile or vehicle, and, due to the arcuate arrangement of the rollers, tend to force the colliding vehicles to one side of each other and thereby lessen materially the force of the impact. As more or less damage will result to the rollers in case of collision, and especially to the rubber covering of the rollers, an important object of the invention is to provide means whereby the rollers may be independently and quickly and easily detached for replacement or repair without the necessity of disassembling the fender frame.

With the above and other objects in view, the invention in its preferred form of details will be described in the following specification, reference being had particularly to the accompanying drawings, in which:—

Figure 1 is a plan or top view of a fender embodying the invention.

Fig. 2 is a front elevation thereof.

Fig. 3 is a sectional view taken on the line 3—3 of Fig. 1.

Fig. 4 is an enlarged sectional view showing the manner of journaling the rollers in the frame.

Fig. 5 is a fragmentary perspective view of the lower frame member, showing the detachable clip in dotted lines and the slot which jointly form a bearing for the lower end of the roller axes.

Fig. 6 is a perspective view of the clip forming in part a bearing and retainer for the lower end of the roller axes.

Referring now more particularly to the drawings, the fender frame preferably consists of arcuate channel bars 5, arranged in parallel and spaced relation, and which bars are rigidly connected, as by means of a welded bar 6, and by means of bracket arms 7, which are forked as shown, and which forked ends are bolted or otherwise suitably secured to the channel bars 5, so as to give rigidity and strength to the fender frame as a whole. The bracket arms 7 are adapted for mounting the fender in operative position on an automobile considerably in advance of the front wheels thereof, and may be bolted to the chassis frame, for which bolt holes 8 are provided, or otherwise suitably secured in operative position.

Mounted between the channel bars 5 and suitably journaled therein, are a plurality of rollers 9 arranged in relatively close formation from end to end of the bars, the rollers having the same arcuate formation as the bars. Due to such formation, the rollers will, upon impact with another automobile, especially if such strike each other at a slight angle, tend to force the colliding vehicles to the side of each other, due to the lessened friction afforded by the rollers between contacting parts sliding upon one another, as will be obvious. In order to somewhat cushion the force of impact against the rollers, I provide the same with a relatively thick surfacing of yielding rubber 10, the rollers being preferably made of hard wood, with suitable lengths of rod iron or steel passed therethrough to give same strength and to serve as the axes therefor.

Obviously, in the event of collision, the rollers would be susceptible to more or less damage, and especially the rubber surfaces thereof, and to permit the quick and easy removal thereof for replacement or repair without disassembling the frame parts, means are provided to permit the accomplishment of such purpose. The upper channel bar 5 is provided with round apertures 11 to receive the upper end of the roller axes, and the lower channel bar 5 is provided with slots 12 formed in one corner of the bar as in the manner shown, the inner end of such slots being rounded, and the outer end thereof extending downwardly a sufficient distance in the face of the bar to permit the lower end of the roller axes to be freely passed into and in abutment with the inner end of the slots, the upper end of the axes previously being inserted in apertures of the upper bar. Conversely the roller may be removed by first withdrawing the lower end of the axes from the slot. In order to prevent displacement of the end of the axes in the slot in a forward direction, I provide a clip 13 of flexible sheet metal, having a downwardly extending member 14, and forked portions 15 provided terminally with downward directed hooks 16. With the roller in position, the clip is applied between the lower end thereof, and the bar, with the forked portions straddling the axes, and the hooked ends of the forked portions gripping the inner edge of the bar, which operative position of the clip is shown in full lines in Fig. 4, and in dotted lines in Fig. 5. The clip being of spring metal, this permits the hooked ends thereof to be slightly sprung outwardly with a suitable tool so as to constrictively embrace the edge of the bar, and thus securely hold the same to place without the use of any other fastening means, whereby the same may be easily and quickly applied or removed. As shown in said views, the depending member 14 fits into the groove portion in the face of the bar, thus obscuring the slot. With the weight of the roller resting thereon, the clip is effectively held against becoming loose or rattling.

While the foregoing is the preferred form of my invention, it is to be understood that I do not limit myself to the precise structure shown and described, as it is obvious that the same may be variously modified without departing from the spirit of the invention.

What is claimed is:—

1. A fender of the class described, comprising a frame having spaced bars, rollers having their axes journaled in and adapted to revolve between said bars, and elements in part forming bearings for one end of said axes and adapted to have a constrictive engagement with the bar for securing same in operative position.

2. A fender of the class described, comprising a frame having spaced bars, rollers having one end of their axes journaled in apertures in one of said bars, the other bar having transverse slots open at one end to receive the other axes ends, and forked elements adapted to straddle said axes ends for holding same in operative position in the slots.

3. A fender of the class described, comprising a frame having spaced bars, rollers having one end of their axes journaled in one of said bars, the other bar having slots open at one end to receive and journal the other axes ends, and forked elements adapted to straddle and hold said axes ends in operative position in said slots, and to have a binding engagement with the bar for detachably securing the same thereto.

4. A fender of the class described, comprising a frame having spaced channel bars, rollers having one end of their axes journaled in apertures in one of said bars, the other bar having slots formed in one corner thereof to permit the free entry and removal of the other ends of the axes, and flexible clips adapted to straddle and hold the slot engaging axes ends in operative position therein, said clips having hooked ends for constrictive engagement with the bar edge, and a depending end member adapted to fit into and form a closure for the open end of the slot.

In testimony whereof I affix my signature.

GEORGE W. SINGER.